United States Patent [19]

Peterson et al.

[11] Patent Number: 5,632,006

[45] Date of Patent: May 20, 1997

[54] CIRCUIT AND METHOD OF ERROR CORRECTING WITH AN ARTIFICIAL NEURAL NETWORK

[75] Inventors: William M. Peterson, Chandler; Sidney C. Garrison, III, Tempe, both of Ariz.

[73] Assignee: Motorola, Inc., Schaumburg, Ill.

[21] Appl. No.: 844,328

[22] Filed: Mar. 2, 1992

[51] Int. Cl.$^6$ .............................. G06E 1/00; G06E 3/00; G06F 15/18

[52] U.S. Cl. .................. 395/24; 395/21; 395/23

[58] Field of Search .................. 395/22, 23, 24, 395/27, 25; 307/201, 20–21; 382/155–159

[56] References Cited

U.S. PATENT DOCUMENTS

| | | | |
|---|---|---|---|
| 4,858,147 | 8/1989 | Conwell | 395/27 |
| 5,014,219 | 5/1991 | White | 395/23 |
| 5,065,040 | 11/1991 | Peterson et al. | 395/24 |
| 5,067,095 | 11/1991 | Peterson et al. | 395/24 |
| 5,092,343 | 3/1992 | Spitzer et al. | 395/22 |
| 5,097,141 | 3/1992 | Leivian | 307/201 |
| 5,103,496 | 4/1992 | Andes et al. | 395/24 |
| 5,146,602 | 9/1992 | Holler et al. | 395/23 |
| 5,166,539 | 11/1992 | Uchimura et al. | 307/201 |
| 5,179,596 | 1/1993 | Weingard | 395/25 |
| 5,216,751 | 6/1993 | Gardner et al. | 395/27 |
| 5,251,626 | 10/1993 | Nickolls et al. | 395/27 |

*Primary Examiner*—David K. Moore
*Assistant Examiner*—Tariq Hafiz
*Attorney, Agent, or Firm*—Robert D. Atkins

[57] ABSTRACT

An artificial neural network performs error correction on an input signal vector. The input signal vector is process in a forward direction through synapses in each of a plurality of neurons for providing an output signal from each of the neurons. The output signals from the neurons are monitored until the one having the greatest activity level is identified. A reverse flow signal having a predetermined magnitude is processed in the reverse direction through the neuron having the greatest activity level for updating the input signal vector. Alternately, the output signals of competing neurons may be applied through synapses weighted to favor the neuron having the greatest output signal activity. Thus, the neuron with synapses most closely matched to the elements of the input signal vector overpowers the remaining neurons and wins the competition. Once the winning neuron is identified, its output signal is reverse processed through the respective neuron for providing an improved input signal vector with reduced noise and error. The improved signal is reprocessed in the forward direction through the neural network for providing higher confidence output signals.

16 Claims, 4 Drawing Sheets

CIRCUIT AND METHOD OF ERROR CORRECTING WITH AN ARTIFICIAL NEURAL NETWORK

BACKGROUND OF THE INVENTION

This invention relates in general to neural networks and, more particularly, to a circuit and method of enhancing the contrast of an input signal vector with the recognition properties of an artificial neural network.

Neural networks are well known in the art for contrast enhancement and recovery of distorted signals in the presence of noise. When a noisy or corrupt input signal vector is applied at the synaptic inputs of a neural network, for example a pre-trained Kohonen feature map, the neuron, or group of neurons, having synapses most closely matched to the elements of the input signal vector maintains the highest level of output signal activity relative to the other neurons in the feature map. Even though one or more elements of the input signal vector are corrupt or missing, the feature map still recognizes the data pattern. Thus, neural networks generally possess the property of averaging-out the noise and missing data such that the closest transformation of an ideal input signal vector may still be realized at the output of the feature map. Of course, the cleaner the input signal vector, the higher the output signal activity of the matching neuron(s) and the more confidence in the recognition level of the neural network.

Most neural networks provide a non-recursive, single pass of the input signal vector through the neurons in a particular feature map layer. The neural network accepts the input signal vector as the best available information from which to decode and recognize the associated information. Neural networks in the prior art generally lack the feature of using the inherent recognition properties of the network to pre-condition and clean up the input signal vector by removing noise and identifying missing or corrupt elements.

Another limitation with conventional neural networks is that self-organized neural networks traditionally cannot do supervised training. However, they have other advantages including rapid learning and a simple local learning rule which would be useful for supervised learning.

Hence, a need exits for an improved neural network having increased resolution of the input signal vector by reducing the noise content thereof by replacing missing or corrupt elements of information. It would be advantageous to optionally select supervised training only, self-organized training only, or some combination thereof in the same neural network.

SUMMARY OF THE INVENTION

Briefly stated, the invention comprises a neural network including a plurality of neurons each having first I/O terminals and second I/O terminals where the first I/O terminals respectively receive elements of an input signal vector. The plurality of neurons each include a plurality of bi-directional synapses each with a first terminal coupled for receiving one of the elements of the input signal vector and a second terminal coupled to the second I/O terminals such that a first one of the second I/O terminals provides an output signal in response to the input signal vector. A circuit is coupled to the second I/O terminals of the plurality of neurons for monitoring the output signals thereof and selecting at least one of the output signals of the plurality of neurons having bi-directional synapses with a closest match to the input signal vector. The circuit provides an output signal to a second one of the second I/O terminals of the selected at least one of the plurality of neurons for processing in a reverse direction through the selected at least one of the plurality of neurons and providing an output signal vector at the first I/O terminals.

In another aspect, the present invention is a method performing bi-directional signal transformations through a network of weighting elements comprising the steps of processing elements of an input signal vector in a forward direction through a plurality of synapses respectively in each of a plurality of neurons for providing an output signal from each of the plurality of neurons, monitoring the output signals from the plurality of neurons and selecting at least one of the output signals from the plurality of neurons having a greatest activity level, generating a reverse flow signal corresponding to the selected at least one of the output signal having the greatest activity level, and processing the reverse flow signal in a reverse direction through the selected at least one of the plurality of neurons for updating the elements of the input signal vector.

In yet another aspect, the present invention is a neural network including a plurality of neurons each having a plurality of first synapses coupled for receiving elements of an input signal vector as applied at a plurality of inputs. The plurality of neurons each have an output for providing an output signal in response to the input signal vector. A second synapse includes an input coupled for receiving the output signal of a first one of the plurality of neurons and having an output coupled for summing with the output signal of the first one of the plurality of neurons. The second synapse has a predetermined positive value. A third synapse includes an input coupled for receiving the output signal of a second one of the plurality of neurons and having an output coupled for summing with the output signal of the first one of the plurality of neurons. The third synapse has a predetermined negative value.

DETAILED DESCRIPTION OF THE PREFERRED EMBODIMENT

Figure 1:
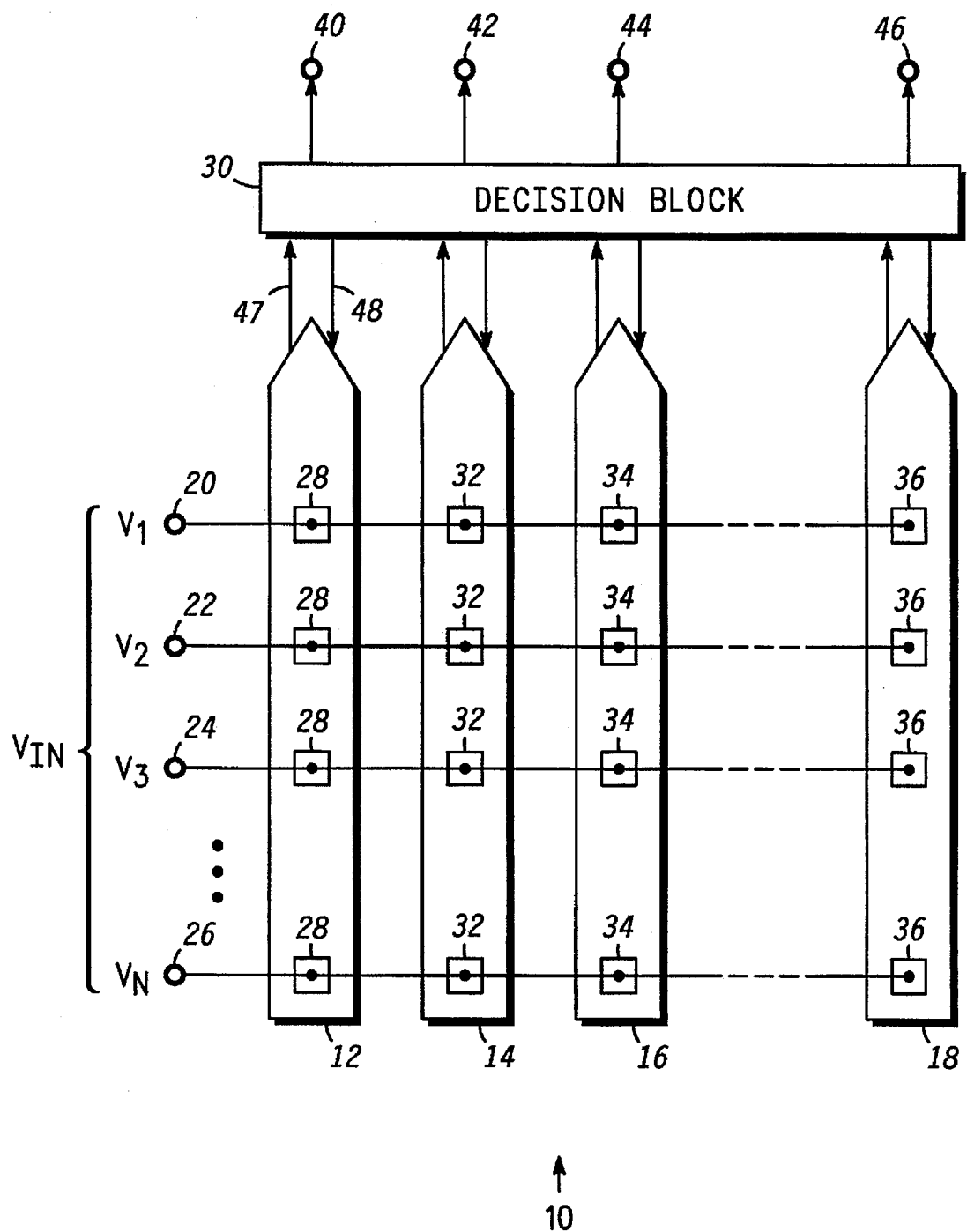
FIG. 1 is a block diagram of a single layer of a neural network.

Referring to FIG. 1, neural network 10 is shown as a simplified, single-layer feature map including neurons 12, 14, 16 and 18 each coupled for receiving elements $V_1$, $V_2$, $V_3$ through $V_N$ of input signal vector, $V_{IN}$, at terminals 20, 22, 24 and 26, respectively. Neuron 12 is shown with four synapses 28 coupled for receiving the elements of the input signal vector $V_{IN}$, respectively, while providing an output signal to decision block 30. Each synapse 28 is pretrained to a particular value. Likewise, neuron 14 includes four synapses 32 coupled in parallel with synapses 28 of neuron 12 for receiving the elements of the input signal vector $V_{IN}$, respectively. The output signal of neuron 14 is also applied to decision block 30. Synapses 34 of neuron 16 and synapses 36 of neuron 18 are also coupled in parallel for receiving the input signal vector, while the output signals thereof are applied to decision block 30.

A detailed explanation of a single neuron (like 12–18) including the training process for the synapses is provided in U.S. Pat. No. 5,067,095, entitled "SPANN: Sequence Processing Artificial Neural Network" and is hereby incorporated by reference. Briefly, each element of the input signal vector is multiplied by the corresponding weighting element of the respective neuron and summed and processed in the forward direction through a predetermined sigmoid function for providing the output signal of the neuron. Another embodiment of neurons 12–18 (sum of differences approach) is discussed in U.S. Pat. No. 5,097,141, entitled "Simple Distance Neuron" which is also incorporated by reference.

The neuron having the closest match between its synaptic weights and the input signal vector $V_{IN}$ produces the highest activity output signal, or lowest activity output signal for a simple distance neuron, supra, and is thus declared the "winner". Those neurons having synapses with a low degree of correlation to a particular input signal vector have a lower output activity level.

A key feature of the present invention is provided in decision block 30 wherein the output signals of neurons 12–18 are monitored to determine the winner(s) after which the resultant winning signal(s) are routed back in the reverse direction through the respective neurons to terminals 20–26 for providing an improved input signal vector. Alternately, the output signals of neurons 12–18 can also made available through decision block 30 at terminals 40, 42, 44 and 46, respectively, for use by other feature map layers depending on the network interconnection. The reverse processing of the winning signal through the winning neuron significantly reduces noise interference and improves error correction. Therefore, neurons 12–18 must be capable of bi-directional signal transformation. Such a feature is described in U.S. Pat. No. 5,065,040, entitled "Reverse Flow Neuron" and is hereby incorporated by reference. Terminals 20–26 may be connected to sample and hold circuits as described in the 5,065,040 reference.

For example, assume an input signal vector $V_{IN}$ (each element equal to 0.5 for simplicity) is applied at terminals 20–26 with the exception that the signal element $V_1$ containing an erroneous value of 0.25. Synapses 28 of neuron 12 (each trained to value 0.5) matches the input signal vector $V_{IN}$ with the highest degree of correlation as compared to synapses 32–36 of neurons 14–18 having other trained values. Therefore, in spite of one faulty element $V_1$, the output signal of neuron 12 still has the highest activity level.

Decision block 30 detects neuron 12 having the highest output signal level via conductor 47 and routes a reverse flow signal, say with a value of unity, back through neuron 12 by way of conductor 48. The unity signal (1.0) from decision block 30 is multiplied by the individual synaptic weights 28 of neuron 12 (0.5) and emerges at terminals 20–26 as a virtually error free input signal vector $V_1=V_2=V_3=V_N=0.5$. That is, the signal element $V_1$ is corrected from the erroneous value of 0.25 to the proper value of 0.5 by normalizing the output signal of the winning neuron to unity and multiplying the same signal by the weights of the winning neuron in the reverse direction. Since synapses 28 are trained to have weights equal to the ideal input signal vector, modifying the input signal vector $V_{IN}$ to be equal to that of the weights cancels any noise present in $V_{IN}$ as originally applied. Thus, the signal pattern appearing at terminals 20–26 is the best estimate of the ideal input signal vector as detected and corrected through neural network 10. The corrected input signal vector may be reprocessed in the forward direction through neural network 10 thereby providing a greater degree of confidence in the transformed output signals.

Figure 2:
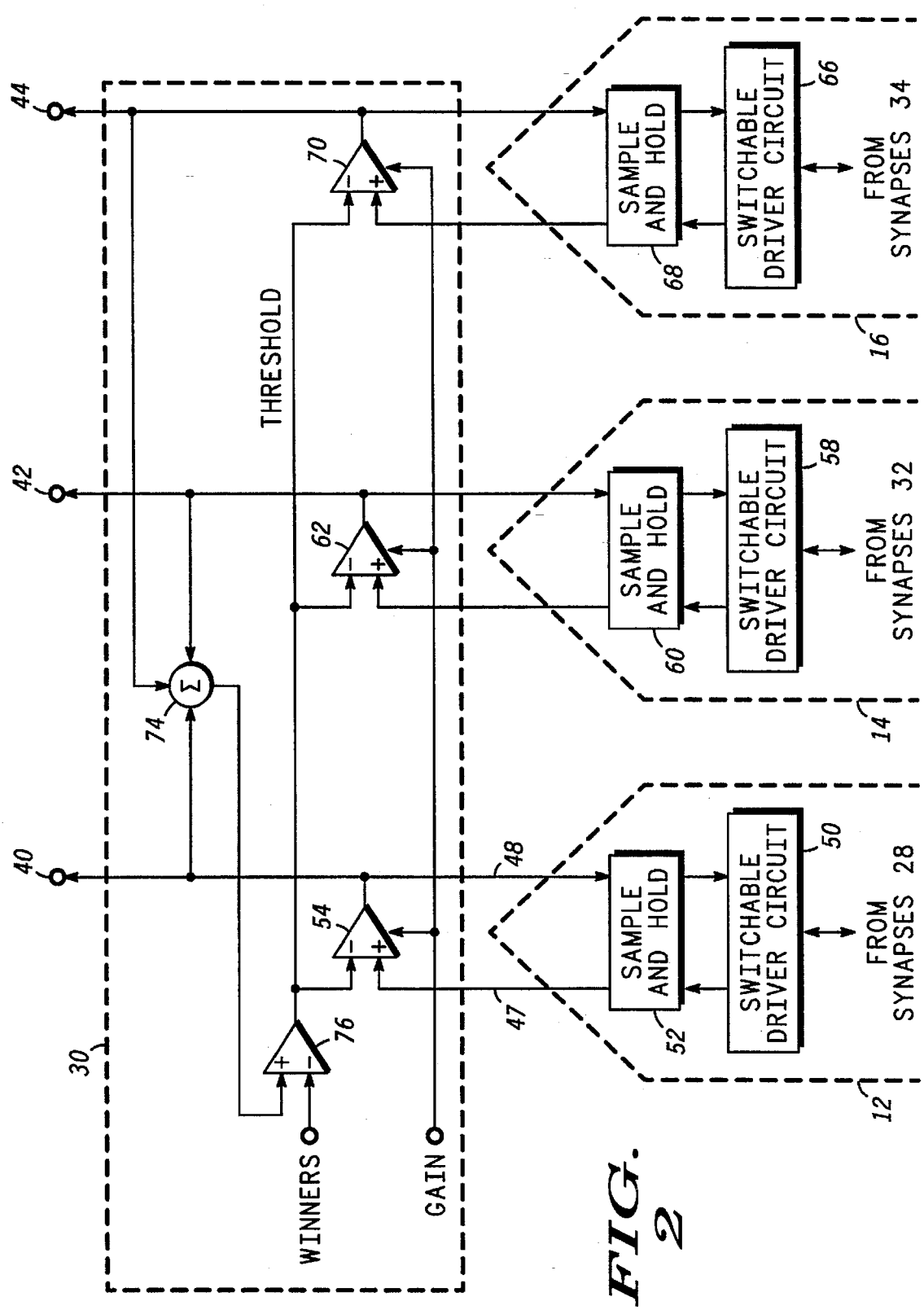
FIG. 2 is a block diagram illustrating the decision block of FIG. 1.

Turning to FIG. 2, further detail is shown of neuron 12 including a switchable driver circuit 50 and sample and hold circuit 52 which are more fully described in the aforementioned U.S. Pat. No. 5,065,040 incorporated by reference. Briefly, the signal from synapses 28 of neuron 12 is applied to switchable driver circuit 50 which routes the signal to sample and hold circuit 52 in response to a control signal from a control circuit (not shown) for application to the non-inverting input of amplifier 54 of decision block 30 via conductor 47. The output signal of amplifier 54 is applied at terminal 40 and back through conductor 48 to sample and hold circuit 52. Note that conductors 47 and 48 could be collapsed into a single conductor by time multiplexing the signals and then demultiplexing prior to application to amplifier 54.

Likewise, neuron 14 comprises a switchable driver circuit 58 and sample and hold circuit 60. The signal from synapses 32 of neuron 14 is applied to switchable driver circuit 58 which routes the signal to sample and hold circuit 60 in response to the control signal for application to the non-inverting input of amplifier 62 of decision block 30. The output signal of amplifier 62 is applied at terminal 42 and to sample and hold circuit 60. Neuron 16 includes a switchable driver circuit 66 and sample and hold circuit 68. The signal from synapses 34 of neuron 16 is applied to switchable driver circuit 66 which routes the signal to sample and hold circuit 68 in response to the control signal for application to the non-inverting input of amplifier 70. The output signal of amplifier 70 is applied at terminal 44 and to sample and hold circuit 68.

Amplifiers 54, 62 and 70 are each responsive to a GAIN control signal for adjusting their degree of amplification and further responsive to a THRESHOLD control signal applied at the inverting inputs for controlling the trip level of each amplifier. The output signals of amplifiers 54, 62 and 70 sum through summing junction 74. The output signal of summing junction 74 is applied at the non-inverting input of amplifier 76 while the inverting input of the same receives a WINNERS control signal. The WINNERS control signal selects the allowed number of winning neurons. The output signal of amplifier 76 provides the THRESHOLD control signal to adjust the threshold detection of amplifiers 54, 62 and 70. The GAIN control signal and the WINNERS control signal may be set by external control circuitry (not shown).

The operation of decision block 30 proceeds as follows. The input signal vector $V_{IN}$ is processed through neurons 12–16 and switchable driver circuits 50, 58 and 66 where the resultant output signals are stored in sample and hold circuits 52, 60 and 68. The processing occurs in definable cycles allowing time to preset the detection feature of decision block 30. Amplifiers 54, 62 and 70 have adjustable detection thresholds controlled by the THRESHOLD control signal provided at the output of amplifier 76. For the present example, assume that the output signal of neuron 12 is greater (synapses 28 have the highest degree of correlation to the input signal vector $V_{IN}$) than the output signal of neuron 14 which in turn is greater than the output signals of neurons 16 and 18.

Prior to each processing cycle, the THRESHOLD control signal is set to a predetermined low value by amplifier 76 so that amplifiers 54, 62 and 70 are tripped and the output signals thereof are operating at a high level. Assume the GAIN control signal is set to a value of 1.0 such that amplifiers 54, 62 and 70 each produce unity output signals when tripped. The WINNERS control signal is also set to a value of 1.0 to allow one winning neuron.

As the processing cycle begins, the three unity output signals of amplifiers 54, 62 and 70 sum through summing junction 74 and produce a signal of value 3.0 at the non-inverting input of amplifier 76. The THRESHOLD control signal increases since the signal at the non-inverting input of amplifier 76 is greater than the signal at its inverting input. The THRESHOLD control signal increases causing amplifier 70 to drop out. Recall the output signal from neuron 16 has the lowest activity level in the present scenario.

The output signal of summing junction 74 is now a value of 2.0 given the low output signal (0.0) from amplifier 70. Yet, the THRESHOLD control signal continues to increase since the signal (2.0 from the sum of the unity output signals of amplifiers 54 and 62) at the non-inverting input of amplifier 76 is greater than the signal at its inverting input (1.0). Once amplifier 62 shuts off, the non-inverting input of amplifier 76 is equal to the inverting input and the THRESHOLD control signal holds steady. The winning neuron 12 is thus identified as the one with a high output signal and the unity reverse flow signal from amplifier 54 may be stored in sample and hold circuit 52. The reverse processing through neuron 12 to achieve an improved input signal vector and subsequent reprocessing through neural network 10 proceeds as described above.

Another method of operation of decision block 30 involves an averaging of the input signal vector $V_{IN}$ by allowing multiple winning neurons. Again assume that the output signal of neuron 12 is greater than the output signal of neuron 14 which is greater than the output signal of neuron 16. The THRESHOLD control signal is set to a predetermined low value by amplifier 76 so that amplifiers 54, 62 and 70 are tripped and the output signals thereof are at a level of 0.5 as determined by the GAIN control signal also having value of 0.5. The WINNERS control signal is set to a value of 1.0 to allow two winning neurons (twice the value of the output signals of the amplifiers).

As the processing cycle begins, the three output signals of amplifiers 54, 62 and 70 sum through summing junction 74 and produce a signal of value 1.5 at the non-inverting input of amplifier 76. The THRESHOLD control signal increases since the signal (1.5) at the non-inverting input of amplifier 76 is greater than the signal (1.0) at its inverting input. The THRESHOLD control signal increases until amplifier 70 drops out.

The output signal of summing junction 74 is now a value of 1.0 with the low output signal from amplifier 70. The non-inverting input of amplifier 76 is thus equal to the inverting input and the THRESHOLD control signal holds steady. The winning neurons 12 and 14 are identified as the ones with a high output signals and the reverse flow signals from amplifiers 54 and 62 may be stored in respective sample and hold circuits 52 and 60. The reverse flow signal levels of 0.5 are reverse processed through neurons 12 and 14, respectively. Instead of multiplying the synapses of a particular neuron by unity, the reverse flow signals are an average of synapse 28 ($S_{28}$) and synapse 32 ($S_{32}$), i.e., $V_1=0.5 \times S_{28}+0.5 \times S_{32}$, $V_2=0.5 \times S_{28}+0.5 \times S_{32}$, $V_3=0.5 \times S_{28}+0.5 \times S_{32}$, etc. The input signal vector is now an improved average of neurons 12 and 14 and may be subsequently reprocessed through neural network 10 as described above. A similar result is achieved by allowing three neuron winners and multiplying the respective winning synapses by one-third in the reverse direction.

Figure 3:
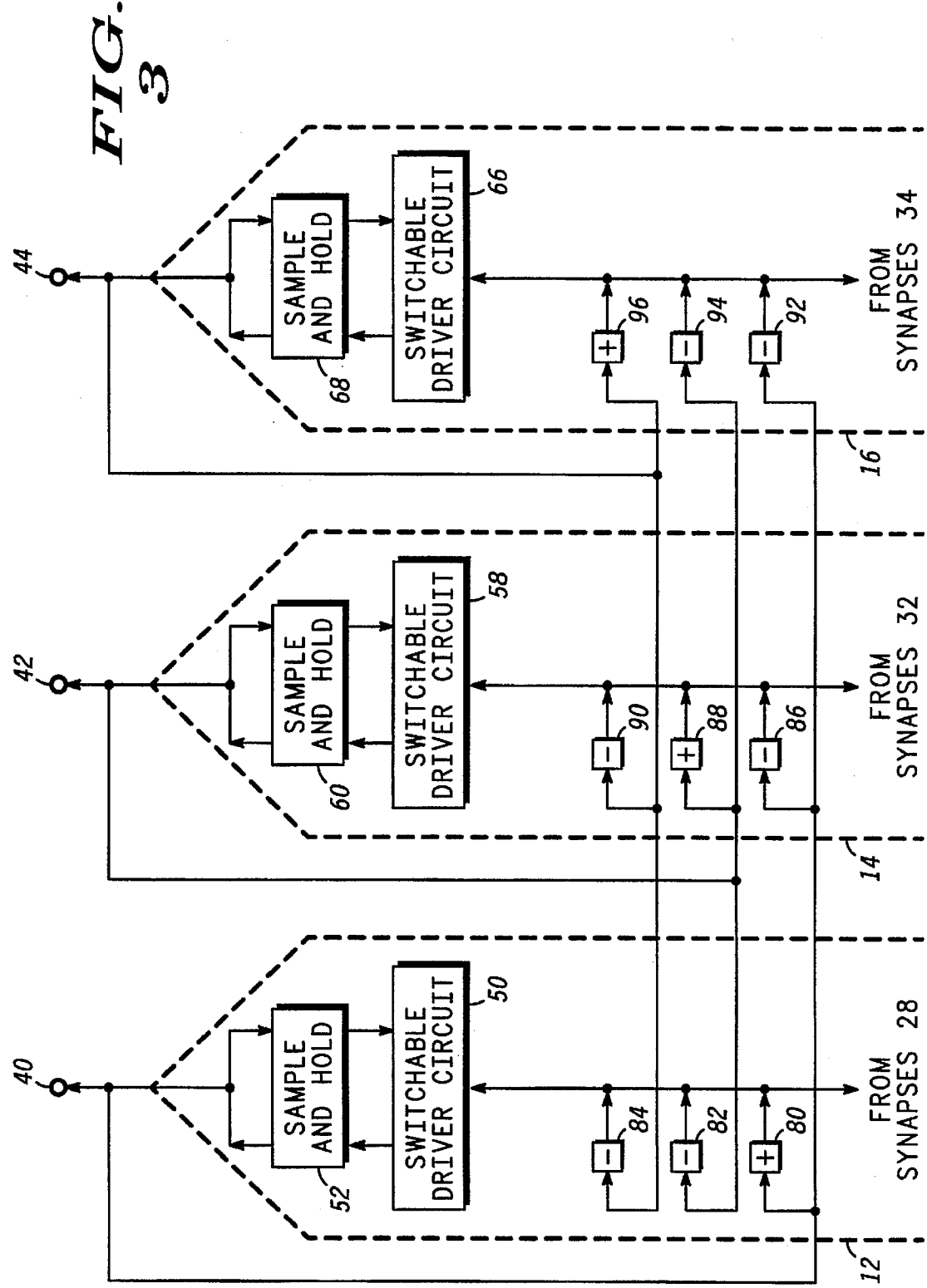
FIG. 3 is a block diagram illustrating an alternate embodiment of the decision block.

Another embodiment of the present invention is shown in FIG. 3, wherein the features of decision block 30 are incorporated into neurons 12–18. Synapses 80, 82 and 84 each have an input coupled to terminals 40, 42 and 44, respectively, and an output coupled to the input of switchable driver circuit 50. Likewise, synapses 86, 88 and 90 each have an input coupled to terminals 40, 42 and 44, respectively, and an output coupled to the input of switchable driver circuit 58, while synapses 92, 94 and 96 have an input coupled to terminals 40, 42 and 44 and an output coupled to the input of switchable driver circuit 66. The weights of synapses 80, 88 and 96 are each set at predetermined positive values, while the weights of synapses 82, 84, 86, 90, 92 and 94 are each set at predetermined negative values.

In the aforedescribed configuration, the output signals of competing neurons tend to subtract from the overall output signal level of each neuron. For example, assume neuron 12 has the highest degree of correlation to the input signal vector $V_{IN}$ and correspondingly the highest output signal activity level from synapses 28. The high output signal reaches terminal 40 and flows back to synapse 80 where it adds to the signal from synapses 28. However, the signal from terminal 40 also flows to synapses 86 and 92 where it subtracts from the signals from synapses 32 and 34, respectively. The output signals at terminals 42 and 44 decrease because of the devaluation by way of synapses 86 and 92. Although the output signals from terminals 42 and 44 tend to subtract from the output signal level of neuron 12 by way of synapses 82 and 84, the overall trend favors neuron 12 since its original output signal level was the greatest by virtue of the higher correlation to the input signal vector. A similar scenario follows when neuron 14 or neuron 16 has the greatest correlation to a particular input signal vector.

Thus, the neuron with synapses most closely matched to the elements of the input signal vector $V_{IN}$ overpowers the remaining neurons and wins the competition. Once the winning neuron is identified, its output signal is reverse processed through the respective neuron by the control signals operating sample and hold circuits 52, 60 and 68 and switchable driver circuits 50, 58 and 66 for providing an improved input signal vector with reduced noise and error. The improved signal is reprocessed in the forward direction through neural network 10 for providing higher confidence output signals at terminals 40–46.

The embodiments of decision block 30 in FIGS. 2 and 3 are illustrated by way of example. There are a number of techniques of monitoring the output signals of neurons 12–18 and selecting the one(s) with the highest signal level. For example, amplifiers 54, 62 and 70 of FIG. 2 may have non-linear transfer functions, possibly implementing a sigmoid function. Other such embodiments including a serial search are considered within the scope of the present invention.

Figure 4:
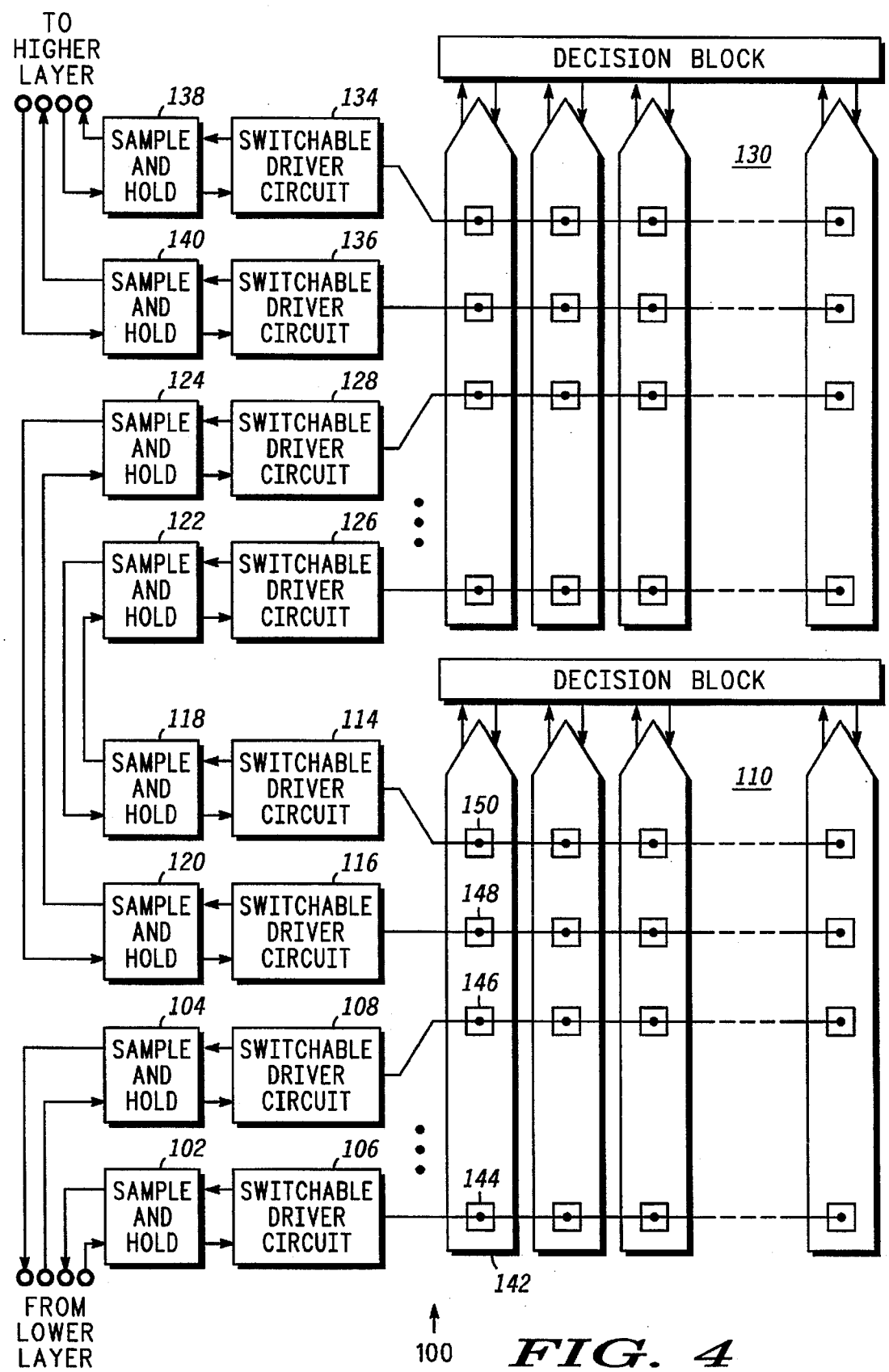
FIG. 4 is a block diagram illustrating an interconnection of multiple neural network layers.

Referring to FIG. 4, a two-level neural network 100 is shown as an example of expanding the concept of FIG. 1. Neural network 100 could be expanded to any number of layers using the principals of FIG. 4. An input signal vector, either from an external source, for example a sampled delay line, or from a lower neural network layer, are sampled by sample and hold circuits 102 and 104 for application through switchable driver circuits 106 and 108 to neural network layer 110. After the aforedescribed optional error correction process, the output signal vector from neural network layer 110 is available for switchable driver circuits 114 and 116. Sample and hold circuits 118 and 120 stored the output signal vector for application to the next higher neural network layer. Switchable driver circuits 106–108 and 114–116 are each connected to two rows of synapses for illustration. In a practical application, many more synapses would be required.

The output signal vector from neural network layer 110 becomes the input signal vector for sample and hold circuits 122 and 124 for application through switchable driver circuits 126 and 128 to neural network layer 130. Again after the aforedescribed optional error correction process, the output signal vector from neural network layer 130 is available for switchable driver circuits 134 and 136. Sample and hold circuits 138 and 140 store the output signal vector for application to the next neural network layer.

The operation of neural network 100 proceeds as follows. Consider an sampled input signal vector stored in sample and hold circuits 102–104 and applied through switchable driver circuits 106–108 to neural network layer 110. The neuron, say neuron 142, having synapses 144–146 with the highest degree of correlation with the input vector becomes the winner. The decision block routes a unity output signal in the reverse direction back through synapses 144, 146, 148 and 150 of the winning neuron 142. Synapses 144 and 146 update and correct the input signal vector as described in FIG. 1, while synapses 148 and 150 perform the actual transformation of the input signal vector for the next higher level neural network layer 130.

Another option, possibly simultaneous with the previous feature of processing in the upward direction, is to allow signals from higher level neural network layer 130 to contribute to the competition in neural network layer 110 in deciding the winning neuron. Thus, the higher level information in neural network layer 130 coming down through switchable driver circuits 126–128 can help overcome ambiguities and contentions between similar input signal vectors in neural network layer 110.

For the learning process of neural networks 10 and 100, either an auto-association or hetro-association method can be used. The auto-association has advantages of iterative application for extra recall accuracy. In the hetro-association method, an input signal vector $V_{IN}$, applied for example at the inputs of sample and hold circuits 102–104, and a corresponding training vector $V_T$, applied at the inputs of sample and hold circuits 118–120, can train the network using a direct sum combination of $V_{IN}$ and $V_T$. The neurons learn template patterns (i.e. store information in the synapses) of the form $V_{IN}$ direct sum $V_T$ which are the averages of statistically significant clusters of the input signal patterns. This is a common method of training in a self-organizing neural network.

After training, $V_T$ can be recalled with input signal vector $V_{IN}$ by monitoring the degree of correlation between the portion of the synapses which correspond to $V_{IN}$ for each neuron. If the matching method is a dot product, the components of the input corresponding to $V_T$ can be set to zero (don't care) in which case the degree of match is measured by the neuron output activity. More generally, for any matching method the contribution from synapses corresponding to $V_T$ can be ignored in the activity calculation in which case again the degree of match is measured by the output activity level.

In a subsequent manner for each neuron with activity above some threshold, the decision block can cause a reverse flow calculation and suppress activation in the other neurons, see U.S. Pat. No. 5,065,040 noted above. The output signal vectors are read at the outputs of sample and hold circuits 118–120. If an average of the correlated vectors is desired, the decision block can simultaneously cause a reverse flow calculation in only those neurons with activity above some predetermined threshold. Note the degree of activation can be used to weight the reverse flow values in which case the single output signal vectors can be read at the outputs of sample and hold circuits 118–120.

Hence, what has been provided is a novel neural network capable of monitoring the output signals of each neuron and detecting the neuron(s) with the highest degree of correlation to the input signal vector. The output signal of the winning neuron is reverse processed through the same neuron for providing an input signal vector with improved contrast. While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A neural network, comprising:

a plurality of neurons each having first I/O terminals and second I/O terminals, said first I/O terminals respectively receiving elements of an input signal vector, said plurality of neurons each including a plurality of bi-directional synapses each with a first terminal coupled for receiving one of said elements of said input signal vector and a second terminal coupled to said second I/O terminals such that a first one of said second I/O terminals provides an output signal in response to said input signal vector; and circuit means coupled to said second I/O terminals of said plurality of neurons for monitoring said output signals thereof to select at least one of said output signals of said plurality of neurons having bi-directional synapses with a closest match to said input signal vector, said circuit means providing an output signal to a second one of said second I/O terminals of said selected at least one of said plurality of neurons for processing in a reverse direction through said selected at least one of said plurality of neurons and providing an output signal vector at said first I/O terminals.

2. The neural network of claim 1 wherein said circuit means includes:

a first amplifier having first and second inputs and an output, said first input being coupled to said first one of said second I/O terminals of a first one of said plurality of neurons, said output being coupled to said second one of said second I/O terminals of said first one of said plurality of neurons;

a second amplifier having first and second inputs and an output, said first input being coupled to said first one of said second I/O terminals of a second one of said plurality of neurons, said output being coupled to said second one of said second I/O terminals of said second one of said plurality of neurons;

a summing junction having first and second inputs and an output, said first input being coupled to said output of said first amplifier, said second input being coupled to said output of said second amplifier; and a third amplifier having first and second inputs and an output, said first input being coupled to said output of said summing junction, said second input being coupled for receiving a first control signal, said output being coupled to said second inputs of said first and second amplifiers.

3. The neural network of claim 2 wherein said first and second amplifiers each include a third input coupled for receiving a gain control signal for selecting an output signal level of said first and second amplifiers.

4. The neural network of claim 3 wherein said first one of said plurality of neurons includes:

a first switchable driver circuit having first and second inputs and an output, said first input being coupled to said second terminal of said plurality of bi-directional synapses of said first one of said plurality of neurons; and a first sample and hold circuit having first and second inputs and first and second outputs, said first input being coupled to said output of said first switchable driver circuit, said first output being coupled to said first one of said second I/O terminals of said first one of said plurality of neurons, said second input being coupled to said second one of said second I/O terminals of said first one of said plurality of neurons, said second output being coupled to said second input of said first switchable driver circuit.

5. The neural network of claim 4 wherein said second one of said plurality of neurons includes:

a second switchable driver circuit having first and second inputs and an output, said first input being coupled to said second terminal of said plurality of bi-directional synapses of said second one of said plurality of neurons; and a second sample and hold circuit having first and second inputs and first and second outputs, said first input being coupled to said output of said second switchable driver circuit, said first output being coupled to said first one of said second I/O terminals of said second one of said plurality of neurons, said second input being coupled to said second one of said second I/O terminals of said second one of said plurality of neurons, said second output being coupled to said second input of said second switchable driver circuit.

6. A method of performing bi-directional signal transformations through a network of weighting elements, comprising the steps of:

processing elements of an input signal vector in a forward direction through a plurality of synapses respectively in each of a plurality of neurons for providing an output signal from each of said plurality of neurons;

monitoring said output signals from said plurality of neurons to select at least one of said output signals from said plurality of neurons having a greatest activity level;

generating a reverse flow signal corresponding to said selected at least one of said output signal having said greatest activity level; and processing said reverse flow signal in a reverse direction through said selected at least one of said plurality of neurons for updating said elements of said input signal vector.

7. The method of claim 6 wherein step of monitoring said output signals from said plurality of neurons, comprising the steps of:

summing said output signals from said plurality of neurons for providing a summation signal;

comparing said summation signal to a first control signal having a predetermined magnitude for providing a threshold control signal;

comparing said threshold signal to each of said output signals from said plurality of neurons; and adjusting said threshold control signal until at least one of said output signals from said plurality of neurons is identified as having said greatest activity level.

8. A neural network, comprising:

a plurality of neurons each having a plurality of first synapses coupled for receiving elements of an input signal vector as applied at a plurality of inputs, said plurality of neurons each having an output for providing an output signal in response to said input signal vector;

a second synapse having an input coupled for receiving said output signal of a first one of said plurality of neurons and having an output coupled for summing with said output signal of said first one of said plurality of neurons, said second synapse having a predetermined positive value; and a third synapse having an input coupled for receiving said output signal of a second one of said plurality of neurons and having an output coupled for summing with said output signal of said first one of said plurality of neurons, said third synapse having a predetermined negative value.

9. The neural network of claim 8 further comprising a fourth synapse having an input coupled for receiving said output signal of a third one of said plurality of neurons and having an output coupled for summing with said output signal of said first one of said plurality of neurons, said fourth synapse having a predetermined negative value.

10. The neural network of claim 9 further comprising a fifth synapse having an input coupled for receiving said output signal of said second one of said plurality of neurons and having an output coupled for summing with said output signal of said second one of said plurality of neurons, said fifth synapse having a predetermined positive value.

11. The neural network of claim 10 further comprising a sixth synapse having an input coupled for receiving said output signal of said first one of said plurality of neurons and having an output coupled for summing with said output signal of said second one of said plurality of neurons, said sixth synapse having a predetermined negative value.

12. The neural network of claim 11 further comprising a seventh synapse having an input coupled for receiving said output signal of said third one of said plurality of neurons and having an output coupled for summing with said output signal of said second one of said plurality of neurons, said seventh synapse having a predetermined negative value.

13. The neural network of claim 12 wherein said first one of said plurality of neurons includes:

a first switchable driver circuit having first and second inputs and an output, said first input being coupled to said plurality of first synapses of said first one of said plurality of neurons; and a first sample and hold circuit having first and second inputs and first and second outputs, said first input being coupled to said output of said first switchable driver circuit, said first output being coupled to said second input and to said output of said first one of said plurality of neurons, said second output being coupled to said second input of said first switchable driver circuit.

14. The neural network of claim 13 wherein said second one of said plurality of neurons includes:

a second switchable driver circuit having first and second inputs and an output, said first input being coupled to said plurality of synapses of said second one of said plurality of neurons; and a second sample and hold circuit having first and second inputs and first and second outputs, said first input being coupled to said output of said second switchable driver circuit, said first output being coupled to said second input and to said output of said second one of said plurality of neurons, said second output being coupled to said second input of said second switchable driver circuit.

15. A method of performing bi-directional signal transformations through a network of weighting elements, comprising the steps of:

processing elements of an input signal vector in a forward direction through a plurality of synapses respectively in each of a plurality of neurons for providing an output signal from each of said plurality of neurons;

feeding back a first one of said output signals from said plurality of neurons though a first synapse having a predetermined positive value to increase said first one of said output signals; and feeding back a second one of said output signals from said plurality of neurons though a second synapse having a predetermined negative value to decrease said first one of said output signals where a resulting said first one of said output signals is reverse processed through said plurality of synapses.

16. The method of claim 15 further including the steps of:

feeding back said second one of said output signals from said plurality of neurons though a third synapse having a predetermined positive value to increase said second one of said output signals; and feeding back said first one of said output signals from said plurality of neurons though a fourth synapse having a predetermined negative value to decrease said second one of said output signals.

* * * * *